United States Patent [19]

Cogliano

[11] 4,082,830

[45] Apr. 4, 1978

[54] PROCESS OF FORMING A PROTECTIVE COATING AND SHIPPING THE COATING FROM THE SURFACE BEING PROTECTED WHEN NO LONGER REQUIRED

[75] Inventor: Joseph A. Cogliano, Baltimore, Md.

[73] Assignee: W. R. Grace & Co., New York, N.Y.

[21] Appl. No.: 463,340

[22] Filed: Apr. 23, 1974

Related U.S. Application Data

[62] Division of Ser. No. 251,880, May, 1972, Pat. No. 3,823,024.

[51] Int. Cl.$^2$ .............................................. B29D 7/02

[52] U.S. Cl. ...................................... 264/213; 264/24; 264/216; 427/154

[58] Field of Search ................. 264/24, 139, 213, 309; 156/247; 117/6, 104 A, 104 B

[56] References Cited

U.S. PATENT DOCUMENTS

| | | | |
|---|---|---|---|
| 2,119,727 | 6/1938 | Talbot | 264/213 |
| 2,135,151 | 11/1938 | Schur | 117/163 |
| 2,155,441 | 4/1939 | Osborne | 117/104 A |
| 2,249,205 | 7/1941 | Hansen | 117/6 |
| 2,381,865 | 8/1945 | Buchanan | 117/163 |

*Primary Examiner*—James B. Lowe

*Attorney, Agent, or Firm*—Richard P. Plunkett; William W. McDowell, Jr.

[57] ABSTRACT

This invention relates to a strippable coating process and a coating composition therefor comprising (1) a latex, (2) a coagulant for said latex and (3) a debonding agent consisting essentially of a substantially non-volatile additive which is adhesive to at least one of either the coated substrate or coagulated coating, more soluble in water than in the coagulated latex polymer component and having a solubility parameter at least 2(calories/cc)$^{1/2}$ higher than the coagulated latex polymer component.

The protective coating is formed by impinging a stream of a latex and a stream of a coagulant, the two streams being oppositely charged, onto a substrate. After drying an external debonding agent is applied between the coating and the substrate and thereafter the coating is stripped from the substrate.

2 Claims, No Drawings

PROCESS OF FORMING A PROTECTIVE COATING AND SHIPPING THE COATING FROM THE SURFACE BEING PROTECTED WHEN NO LONGER REQUIRED

This is a division, of application Ser. No. 251,880 filed May 10, 1972, now U.S. Pat. No. 3,825,024.

This invention relates to a composition and a process using said composition for forming a protective coating which is easily stripped off of the surface when it is no longer required. More particularly this invention relates to a process for forming a coagulated coating by impinging a stream of a latex and a stream of a coagulant for said latex, at least one of said impinging streams containing a debonding agent, said impingment occurring just prior to or on the surface to be coated, thereby forming an instant coating which coating due to said debonding agent can be readily removed when desired.

The transport of vast quantities of materials has created a great need for a means for temporarily protecting such material from the corrosive effects of the elements during transportation and storage prior to actual use. Transoceanic shipping to tropical or arctic climates is particularly destructive to unprotected metal surfaces due to exposure to salt spray.

There are various instances wherein a permanant protective coating is not permissable. For instance coatings on mechanical replacement parts and the like must be capable of being easily stripped from the part before the article can be put to its intended use. Furthermore, even with articles finished with permanant protective and or decorative coatings, it is sometimes desirable to further temporarily protect the finish against scuffing and abrasion endured during handling in shipment and storage.

Present day industry has long been desirous of an easy method of applying a protective coating to a surface which would preclude said surface from being abraded, scuffed or dirtied in any manner while work was progressing in the immediate work area and which coating could be easily removed after the work was complete. For example the furniture industry has long been looking for a solution to keep their furniture from being marred or scratched from the time it is manufactured in the factory until it reaches the ultimate consumer. The present solution is to pack the furniture in "Kimpak" or other cellulosic material enclosed in heavy paper which not only adds to the bulk and thus the costs of shipping but also requires time consuming removal. Another example is the boating industry which would like to protect the decks and hulls of the boats during the building operation. Scratches, gouges and other marks which necessitate costly repair work could be eliminated by the use of a protective coating which could be readily removed once the building operation was completed. Thus there has been a long felt want for a protective coating material with an easy process of applying same, which coating material could be readily and easily removed when desired.

One object of the instant invention is the application of a coating in a single operation at ambient temperatures without the need for curing. Another object is the application of a coating of substantially uniform thickness to uneven surfaces such as concave and convex surfaces. A still further object of the invention is the provision of a coating composition which has low adherence to the substrate coated whereby the film may be readily stripped from the surface even after extended periods. Still another object of the invention is to provide a strippable coating composition which is waterproof, tough and resilient and which has excellent flexibility at very high and low temperatures. Another object is to provide a strippable coating composition which affords a film that has good tensile strength. Yet another object is to provide a strippable coating composition which may be applied by spraying and without the need for toxic or flammable organic solvents. A further object is to provide a strippable coating composition having good resistance to water vapor transmission. Another object is to provide a strippable coating composition having good resistance to outdoor climatic conditions. Yet another object of the invention is to provide a strippable coating composition affording excellent resistance to corrosion of metal substrates.

The above and other objects, which will become apparent from a reading hereinafter, are obtained by applying a coating formed by impinging two streams, the first stream being a latex of a high polymer having positively or negatively charged particles and the second stream being a coagulant, i.e. an emulsion, dispersion or solution of a substance with oppositely charged particles from said latex, either or both of said impinging streams containing therein a minor amount of a debonding agent, said debonding agent thus allowing the coagulated coating formed to be readily removed from the coated substrate at any time after coagulation.

Latices existing on the market today are a stable dispersion of a polymeric substance in an essentially aqueous medium. A latex during its preparation is stabilized by special emulsifiers which can be either cationic, anionic or nonionic. Operable latexes herein are those having been stabilized with either cationic or anionic emulsifiers thereby rendering positively or negatively charged polymerized particles. When a stream of a latex containing either positively or negatively charged particles is impinged on a stream containing particles of the opposite charge, coagulation takes place almost immediately due to the oppositely charged particles being attracted to one another and thereby losing their charge by neutralization during impact.

One method of impinging two streams of oppositely charged particles is by spraying. The impingement from the spray jets can take place on the substrate or preferably immediately prior to the impinged streams hitting the substrate. Spraying can be accomplished by conventional means such as a double nozzle spray air gun or double nozzle spray paint guns employing electric motors and pumps.

Most known commercially available latices today contain particles which carry negative charges. Such latices are described as anionic. Examples of latices containing particles which carry negative charges operable herein include, but are not limited to, polyvinyl chloride, polyvinylidene chloride, polychloroprene, polyvinylacetate, polybutadiene, polyisoprene (natural rubber or synthetic natural rubber), butadiene/styrene copolymers, butadiene/acrylonitrile copolymers, butadiene/styrene/acrylonitrile terpolymers, carboxylated butadiene/styrene copolymers, butyl rubber (polyisobutylene or isobutylene/styrene), polyvinylpyridine, polyethylene and oxidized polyethylene. Cationic latices are also known. The particles in such latices carry positive charges. Examples of cationic latices include, but are not limited to, polychloroprene, polyethylene and oxidized polyethylene.

The coagulants used in the instant invention to coagulate the latex are well-known conventional materials. For example in coagulating an anionic latex, a coagulant such as a strong acid e.g. sulphuric, hydrochloric, phosphoric, etc., metallic ions, especially bivalent metallic ions e.g. calcium, magnesium, strontium, barium, zinc, etc., water-miscible organic solvents, e.g. ethyl alcohol, acetone etc., polymer-miscible organic solvents e.g. benzene, carbon tetrachloride, etc. and cationic surface-active substances e.g. neoprene latex L-950 commercially available from E. I. Dupont. In the event that the latex is cationic, the coagulant can be a strong base e.g. sodium hydroxide or potassium hydroxide or other well known conventional coagulant.

After coating the substrate to be protected with the latex co-spray, the latex particles during the drying operation form a solid film by slowly squeezing out the aqueous phase which evaporates. A debonding agent is necessary to prevent this film from adhering to the surface. If a non-volatile material is dissolved in the aqueous phase and is not soluble in the organic phase it will remain between these two surfaces and prevent adherence.

The debonding agent and the latex material (neoprene, for example) or the debonding agent and the surface (polyester coated furniture or boats, as examples) must be incompatible. Hildebrand has shown why some pairs of materials mix more readily than others. He utilizes the concept of the solubility parameter "δ" which he defined as $$\delta = (\Delta E/V)^{1/2}$$

where $\Delta E$ = the energy of vaporization $V$ = the molar volume.

If the solubility parameters are alike, the materials tend to form a solution. The greater the difference, however, between the solubility parameters the more immiscible the materials become. see Skeist "Handbook of Adhesives" Reinhold Publishing Corp., 1966, pages 10 and 11. Thus in the instant invention it is necessary that the debonding agent has a solubility parameter at least 2(cal/cc)$^{1/2}$ higher than the latex polymer to decrease adhesion and allow stripping.

The amount of the debonding agent added to the composition can be varied between about 0.1 to 20% by weight of the polymer in the latex. Greater amounts can be added but strippability is not appreciably improved.

The coatings formed on practice of the instant invention can have thicknesses ranging from 0.5 to 250 mils. A preferred range is 2 to 100 mils.

The composition used for coating in the instant invention may, if desired, include such additives as antioxidants, accelerators, dyes, inhibitors, activators, fillers, pigments, flame-retardant agents, thickeners, viscosity modifiers, plasticizers, and the like. Such additives are usually preblended with either the latex or the coagulant. The afore said additives may be present in quantities up to 250 parts per 100 parts of polymer in the latex by weight and preferably 0.01–200 parts on the same basis.

In the examples set out in Table I, an air pressurized spray gun assembly having dual pressure feed tanks and spray guns with intersecting axes was used. The assembly was charged in tank A with a mixture of an anionic Neoprene latex "L-572" (50% solids, solubility parameter 9.3) and 5% by wet weight of the various debonding agents shown in Table I and in tank B with a mixture of a cationic Neoprene latex "L-950" (50% solids, solubility parameter 9.2) and 5% by wet weight of the various debonding agents shown in Table I. Both Neoprene latices are commercially available from E. I. Dupont. The latices were sprayed simultaneously at room temperature (25° C) onto 6 inch × 6 inch glass plates to form dried coatings having thicknesses as shown in Table I. After spraying, the coatings were dried for 48 hours and then measured for adhesive peel strength by the procedure of ASTMD-1000 against a control without any debonding agent. The measurements were made using 1 inch × 6 inch samples on an Instron Tensile Tester at a rate of 1 inch/min. with 180° peel. The results in Table I show up to a 98% decrease in peel strength to remove the coating from the glass substrate.

TABLE I.

| Example Number | Debonding Agent | Solubility Parameter (cal/cc)$^{1/2}$ | Coating Thickness (mils) | Peel Strength | Tensile Data | |
|---|---|---|---|---|---|---|
| | | | | | Modulus (psi) | % Elongation |
| 1 | None (control) | | 21 | 89.0 | 1946 | 589 |
| 2 | Glycerine | 16.5 | 25 | 0.9 | | |
| 3 | Sorbitol | | 26 | 11.0 | 917 | 594 |
| 4 | Pentaerythritol | | 20 | 8.9 | 1821 | 623 |
| 5 | Hexamethylene tetramine | | 7 | 1.3 | 1138 | 599 |
| 6 | Mannitol | | 17 | 7.4 | 2142 | 575 |
| 7 | Ethylene Glycol | 14.6 | 16 | 3.1 | 1282 | 546 |
| 8 | Polyethylene Glycol 606 | 14.6 | 17 | 72.0 | 1995 | 491 |

EXAMPLE 9

An air pressurized spray gun assembly dual pressure feed tanks and spray guns with intersecting axes was used. The assembly was charged in tank A with a mixture of cationic Neoprene latex "L-950," 50% solids, solubility parameter 9.2 (cal./cc)$^{1/2}$ commercially available from E. I. Dupont and Co. and 5% by wet weight of glycerin and in tank B with a mixture of an anionic latex of polyvinyl chloride, 56% solids, solubility parameter 9.6 (cal/cc)$^{1/2}$ "Geon 151" commercially available from B. F. Goodrich Chemical Co. and 5% by wet weight of glycerin. The mixtures were sprayed simultaneously at room temperature (25° C) onto a 6 inch × 6 inch piece of mahogany wood to form a dried coat having a thickness of about 2–3 mils. The coated wood was cut in half and the coating was removed from one piece of the wood after one day of coagulation and from the other piece after 3 weeks. In both cases the coating was readily hand stripped from the wood substrate.

A control using the same reactants and procedure except that the glycerin was omitted resulted in a coagulated coating which could not be hand stripped without tearing the coating in several places.

EXAMPLE 10

Example 9 was repeated several times except that the following commercially available latices were substituted for the polyvinyl chloride latex:

Polyvinylidene chloride, 60% solids, solubility parameter 12.2 $(cal/cc)^{1/2}$ "Daran 220", Dewey & Almy Div., W. R. Grace & Co.;

Polychloroprene, 50% solids, solubility parameter 9.2 $(cal/cc)^{1/2}$ "Neoprene latex L-572", E. I. du Pont Co.;

Polyvinylacetate, 55% solids, solubility parameter 9.4 $(cal/cc)^{1/2}$ "Daratak 62L", Dewey & Almy Div., W. R. Grace & Co.;

Polyisoprene (65% solids) "Shell Isoprene 700", Shell Chemical Co.;

Butadiene/Styrene Copolymer, 52% solids, solubility parameter 8.5 $(cal./cc)^{1/2}$ "Darex X651-1", Dewey & Almy Div., W. R. Grace & Co.;

Butadiene/Acrylonitrile Copolymer, 62% solids, solubility parameter 9.5 $(cal./cc)^{1/2}$ "Nitrex J-8343", Naugatuck Chemical Div. of U.S. Rubber Co.

Carboxylated Butadiene/Styrene Copolymer, 49% solids, solubility parameter 8.5 $(cal/cc)^{1/2}$ "Tylac 1372", International Latex Corp.;

Polyisobutylene, 55% solids, solubility parameter 8.0 $(cal./cc)^{1/2}$ "Dispersion 108", Miller-Stephenson Chemical Co.;

Polyvinyl Pyridine (41% solids) "Gen Tac", The General Tire and Rubber Co.;

Polyethylene (55% solids) "Poly-EM" 12 Spencer Chemical;

Oxidized Polyethylene (25% solids) "AC-392" Allied Chemical.

In all instances the coating was quite readily stripped from the substrate as compared to a control without the glycerin for each latex both after the one day and 3 week coagulating period.

EXAMPLE 11

An air pressurized spray gun assembly having dual pressure feed tanks and spray guns with intersecting axes was used. The assembly was charged in tank A with a mixture of an anionic "Neoprene latex L-572" (50% solids) and 5% by wet weight of glycerin, a debonding agent, and in tank B with a 5% aqueous solution of magnesium sulphate. Jets from the spray guns were intersected just prior to contact with a 6 inch × 6 inch stainless steel plate. The coating formed on the plate had a thickness of about 5 mils. The plate was then cut in half and after one hour the coating was readily stripped from one half of the plate. The other half of the plate was allowed to set at room temperature for three weeks at which time the coating was removed therefrom with the same ease as that shown for the other half of the plate.

EXAMPLE 12

Example 11 was repeated except that 150 parts bentonite clay was dispersed in the coagulant solution. The stripping results were substantially the same.

EXAMPLE 13

An air pressurized spray gun assembly having dual pressure feed tanks and spray guns with intersecting axes was used. The assembly was charged in tank A with a mixture of an anionic "Neoprene latex L-572" (50% solids, solubility parameter 9.2) commercially available from E. I. Dupont, and 5% by wet weight of glycerin, and in tank B with a mixture of a 5% aqueous solution of magnesium aluminum sulphate and 5% by wet weight of glycerin. The mixtures were sprayed simultaneously at room temperature (25° C) onto a 6 inch × 6 inch piece of pine wood. Within 5–10 minutes a coagulated coating about 3 mils thick resulted. After drying for 48 hours under ambient conditions the coating was readily hand stripped from the wood substrate. A control using the same reactants and procedure except that the glycerin was omitted resulted in a coagulated coating which could not be hand stripped.

EXAMPLE 14

Example No. 2 was repeated except that the substrate for the coating was varied in each instance to a 6 inch × 6 inch piece of wood, painted wood, enameled wood, steel, aluminum, tin free steel, copper, concrete, woven and non-woven fabrics both natural and synthetic, paper, paper board, porcelain, ceramic, brick, cinder block, plaster and certain plastics including but not limited to polycarbonate, poly(methylmethacrylate), nylon, poly(ethyleneterephthalate), poly(phenylene oxide) and fiber glass reinforced polyester. In all cases the coating containing the debonding agent was more readily stripped from the substrate as compared to a control.

It has also been found that these coatings whether or not they contain a debonding agent can be stripped by applying an external debonding agent at the interface between the coating and the coated substrate. These external debonding agents have the same characteristics as those set out supra for the internal debonding agent added to the composition prior to coating. The following examples show the use of an external debonding agent.

EXAMPLE 15

An air pressurized spray gun assembly having dual pressure feed tanks and spray guns with intersecting axes was used. The assembly was charged in tank A with an anionic "Neoprene latex L-572" (50% solids, solubility parameter 9.2) and in tank B with a cationic "Neoprene latex L-950" (50% solids, solubility parameter 9.2), both latices being commercially available from E. I. Dupont and Co. The latices were sprayed simultaneously at room temperature onto a 6 inch × 6 inch piece of mahogany. The coating was dried under ambient conditions for 48 hours. The edge of the interface (1 inch wide strip) between the coating and the mahogany was exposed by inserting a knife blade there between. A drop of water was placed in the interface. Using the same adhesive peel strength test set out in Table I the coating had a peel strength of 0 g/in.

EXAMPLE 16

Example 15 was repeated except that a drop of glycerin was used instead of water. The results were the same.

The following examples in Table II show the effect of adding various amounts of the debonding agent.

In the examples set out in Table II, an air pressurized spray gun assembly having dual pressure feed tanks and spray guns with intersecting axes was used. The assembly was charged in tank A with a mixture of an anionic "Neoprene latex L-572" (50% solids, solubility parameter 9.2) and varying amounts on a wet weight basis of glycerin and in tank B with a mixture of a cationic "Neoprene latex L-950" (50% solids, solubility parameter 9.2) and varying amounts on a wet weight basis of glycerin. The amount of glycerin shown in Table II was divided equally between tank A and tank B. The latices were sprayed simultaneously at room temperature (25° C) onto 6 inch × 6 inch glass plates to form coatings. After spraying, the coatings were dried for 48 hours and then measured for adhesive peel strength by the procedure of ASTMD-1000 against a control without any glycerin. The measurements were made using 1 inch × 6 inch samples on an Instron Tensile Tester at a rate of 1 inch/min. with 180° peel. The results are shown in Table II.

TABLE II

Effect of Glycerin Content on Release Properties

| Ex. No. | % Glycerin | % Filler[a] | Coating Thickness (mils) | Peel Strength gms/in. | Tensile Modulus psi |
|---|---|---|---|---|---|
| 17 | 0 | 0 | 7.0 | 24 | 625 |
| 18 | 0.5 | 0 | 11.0 | 21 | 943 |
| 19 | 1.0 | 0 | 11.0 | 9 | 393 |
| 20 | 2.0 | 0 | 15.0 | 2 | 1175 |
| 21 | 4.0 | 0 | 13.0 | 0.5 | 718 |
| 22 | 5.0 | 5.0 | 22.0 | 0.6 | — |

[a]Carbon black

The solubility parameters herein were measured by the procedures set out in "The Solubility of Nonelectrolytes", J. H. Hildebrand and R. L. Scott, Dover Publications, Inc., New York, 1964, pages 424–433.

It is also possible in some instances when using an external debonding agent such as water to apply the water to the surface of the coagulated coating, allow the water to permeate through to the interface between said coating and the coated substrate and then readily strip off the coating. In many cases however due to the high resistance to water vapor transmission of the coagulated coating, the water must be applied at the interface.

What is claimed is:

1. The process of stripping a coating on a substrate which comprises forming a coating by simultaneously impinging on said substrate two streams under ambient conditions, the first stream being a latex of a high polymer, said polymer particles in said latex being electrically charged and a second stream being a coagulant charged oppositely to that of the particles in said latex and after drying adding to the interface between said coating and said substrate an external debonding agent consisting essentially of a substantially non-volatile additive which is adhesive to at least one of either the substrate or coagulated coating, more soluble in water than in the coagulated latex polymer component and having a solubility parameter at least 2 $(\text{calories/cc.})^{1/2}$ higher than the coagulated latex polymer component and thereafter stripping said coating from said substrate.

2. The process according to claim 1 wherein the external debonding agent is water.

* * * * *

UNITED STATES PATENT OFFICE

CERTIFICATE OF CORRECTION

Patent No. 4,082,830 Dated April 4, 1978

Inventor(s) Joseph A. Cogliano

It is certified that error appears in the above-identified patent and that said Letters Patent are hereby corrected as shown below:

In the Claims:

In column 8, line 15, between the word "two" and the word "streams" add --separate and distinct--.

Signed and Sealed this

*Thirty-first* Day of *October 1978*

[SEAL]

*Attest:*

RUTH C. MASON
*Attesting Officer*

DONALD W. BANNER
*Commissioner of Patents and Trademarks*